US009010526B2

(12) United States Patent
Raaz

(10) Patent No.: US 9,010,526 B2
(45) Date of Patent: Apr. 21, 2015

(54) CONVEYOR BELT SYSTEM

(75) Inventor: Viktor Raaz, Bochum (DE)

(73) Assignee: Thyssenkrupp Resource Technologies GmbH, Essen (DE)

( * ) Notice: Subject to any disclaimer, the term of this patent is extended or adjusted under 35 U.S.C. 154(b) by 0 days.

(21) Appl. No.: 14/238,517

(22) PCT Filed: Aug. 10, 2012

(86) PCT No.: PCT/EP2012/065741
§ 371 (c)(1),
(2), (4) Date: Mar. 14, 2014

(87) PCT Pub. No.: WO2013/024050
PCT Pub. Date: Feb. 21, 2013

(65) Prior Publication Data
US 2014/0190798 A1 Jul. 10, 2014

(30) Foreign Application Priority Data

Aug. 12, 2011 (DE) .......................... 10 2011 052 697

(51) Int. Cl.
B65G 15/40 (2006.01)
B65G 15/08 (2006.01)
(52) U.S. Cl.
CPC ...................... B65G 15/08 (2013.01)
(58) Field of Classification Search
CPC ................ B65G 15/08; B65G 15/40
USPC .......................................... 198/819
See application file for complete search history.

(56) References Cited

U.S. PATENT DOCUMENTS

| 4,760,913 | A | | 8/1988 | Tschantz | |
|---|---|---|---|---|---|
| 5,080,221 | A | * | 1/1992 | Steinkotter | 198/819 |
| 5,232,084 | A | | 8/1993 | Simonsen et al. | |
| 5,293,988 | A | * | 3/1994 | Sumino | 198/808 |
| 7,942,259 | B2 | * | 5/2011 | Steven et al. | 198/819 |
| 2010/0018841 | A1 | | 1/2010 | Steven et al. | |
| 2012/0061212 | A1 | * | 3/2012 | Brewka et al. | 198/819 |
| 2013/0334013 | A1 | * | 12/2013 | Enshu | 198/819 |

FOREIGN PATENT DOCUMENTS

| DE | 3803922 A1 | | 8/1988 |
|---|---|---|---|
| DE | 102009043904 A1 | | 3/2011 |
| EP | 0050962 A1 | | 5/1982 |
| JP | 6048808 | * | 3/1985 |
| JP | 6048808 S | | 3/1985 |
| JP | 2000118657 A | | 4/2000 |
| WO | 9202439 A1 | | 2/1992 |

* cited by examiner

*Primary Examiner* — Leslie A Nicholson, III
*Assistant Examiner* — Keith R Campbell
(74) *Attorney, Agent, or Firm* — Laurence A. Greenberg; Werner H. Stemer; Ralph E. Locher

(57) ABSTRACT

A conveyor belt system includes a conveyor belt running in longitudinal direction and support roller assemblies spaced apart along the conveyor belt and each having four support rollers distributed about the outer periphery of the conveyor belt. The conveyor belt is shaped into a tube having overlapping edges by an annular positioning of the support rollers. The conveyor belt extends, viewed in cross-section, from an edge lying on the inside at the overlap in a circumferential direction to an edge lying on the outside. The edges overlap at a last support roller, viewed in circumferential direction, and a distance between the last support roller, viewed in circumferential direction, and a center of gravity of a clear profile bounded by the support rollers is greater than a corresponding distance of the adjacently lying first support roller in circumferential direction.

5 Claims, 3 Drawing Sheets

CONVEYOR BELT SYSTEM

BACKGROUND OF THE INVENTION

Field of the Invention

The invention relates to a conveyor belt system, comprising a conveyor belt running in a longitudinal direction and support roller assemblies which are arranged at a distance from one another along the conveyor belt and which each comprise at least four support rollers distributed around the outer circumference of the conveyor belt, wherein the conveyor belt is shaped into a tube having overlapping edges by an annular positioning of the support rollers of the support roller assemblies.

Conveyor belt systems are used for the transport of the most diverse materials, such as for example rubble, ores, fuels, building materials or suchlike. The conveyor belts often lie in the form of a trough on support rollers lying normal to the conveying direction or run to a tube formed by support roller assemblies with in each case a plurality of support rollers disposed in an annular manner.

Whereas straightforward conveyor belt systems with a conveyor belt operated in the form of a trough usually comprise support roller assemblies with in each case three support rollers, i.e. a central support roller and two lateral support rollers, the present invention relates to an embodiment, wherein the support roller assemblies in the form of support roller stations, support roller garlands or support roller chairs each comprise at least four support rollers. The conveyor belt is formed into a tube with these at least four support rollers on each support roller assembly.

There are known from DE 10 2009 043 904 A1 as well as US 2010/0018841 A1 conveyor belt systems, wherein the support roller assembly in each case comprises six support rollers disposed on a circular ring, so that the conveyor belt has approximately an annular shape. Depending on the strength and the flexibility of the conveyor belt, the shape of a polygon is assumed at the support roller assemblies, because the conveyor belt lies in sections precisely on the support rollers. Otherwise, however, a uniform contour results around the circumference.

Apart from the described, essentially circular arrangement, conveyor belt systems are also known from practice, wherein the conveyor belt overlapping at its lateral ends has an oval shape widened in the lateral direction compared to the circular shape and flatterer in height. With the known circular and oval-shaped arrangements, the clear profile bounded by the support rollers of a support roller assembly is symmetrical in respect of a horizontal and a vertical plane. Whereas, in the case of the circular arrangement of the support rollers, the radial distances from the centre of gravity of the clear profile, i.e. the centre of the clear profile, up to the lateral roller surface is identical in the case of all the support rollers, the two horizontally disposed support rollers, i.e. the lowest support roller and the uppermost support roller, have a smaller radial distance from the centre of gravity than the remaining four obliquely disposed support rollers in the case of the oval-shaped arrangement.

There is known from JP 2000118657 A1 a conveyor belt system with support spaces disposed in a swivellable manner, which are each adjustable normal to their rotational axis, so that the clear profile formed by the support rollers is variable. The profile of the support rollers is, as it were, stipulated by the conveyor belt and the material transported therein. In particular, an oval shape with a vertical orientation can arise, wherein forces as uniform as possible are exerted on the conveyor belt as a result of the mobile arrangement of the support rollers. It is not thereby intended to squeeze or twist the conveyor belt consciously. According to the example of embodiment, the overlapping region of the conveyor belt closed at the circumference lies flat against one of the support rollers.

A conveyor belt with adjustable support rollers, which are disposed in an oval shape with a horizontal orientation, is also known from WO 92/02439 A1.

The torsional stability of the conveyor belt, in particular of the empty conveyor belt, as well as the movement resistance to be overcome by a corresponding drive are decisive properties during the operation of a conveyor belt system. In a comparison of a circular arrangement of the conveyor belt on the one hand and an oval-shaped arrangement on the other hand, it is found that a better torsional stability is observed with the oval-shaped arrangement, but the movement resistance is however increased.

BRIEF SUMMARY OF THE INVENTION

Against this background, the problem underlying the invention is to provide a conveyor belt system which has balanced properties with respect to the torsional stability and the movement resistance.

Proceeding from a conveyor belt system with the features described at the outset, the problem is solved according to the invention by the fact that the conveyor belt extends in cross-section from the edge lying on the inside at the overlap in the circumferential direction to the edge lying on the outside, that the edges overlap on a last—viewed in the circumferential direction—support roller and that the distance between the last—viewed in the circumferential direction—support roller and the centre of gravity of the clear profile bounded by the support rollers is greater than the corresponding distance of the first support roller lying adjacent in the circumferential direction. According to the second embodiment, also proceeding from a known conveyor belt system, the belt transverse bending energy is taken into account to improve the running properties and the safety against twisting. However, an embodiment that is essentially mirror-symmetrical in respect of a vertical axis is not selected. On the contrary, the distance increases between the centre of gravity viewed in the circumferential direction, i.e. from the inner edge to the outer edge, related to the conveyor belt or to the support rollers.

For reasons of energy, the conveyor belt is forced into a position in which the belt transverse bending energy is minimal, i.e. the belt seeks to assume the maximum possible radius, for which reason the latter tends to turn in the direction of the outer edge in the circumferential direction. Since the overlapping region lies against the last—viewed in the circumferential direction—support roller, the outer edge of the conveyor belt is therefore forced in the direction of the first support roller lying next to the latter. Since the first support roller is set at a considerably angle with respect to a last support roller, the first support roller acts as a kind of stop for the outer edge of the conveyor belt. According to the embodiment according to the invention, the direction of rotation is imparted to the entire conveyor belt in the circumferential direction such that the outer edge is held at the transition between the first and the last support roller.

This is a fundamentally different approach from the embodiment that is known from JP 2000118657 A. Whereas, according to the prior art, the belt itself ultimately stipulates the position of the rollers, a direction of rotation is imparted to the belt according to the present invention by the arrangement of the support rollers, with which direction of rotation the edge of the conveyor belt lying outermost in the overlapping region is pressed at an angle against the first support roller which then acts as a stop.

Such an application of the direction of rotation cannot arise if the orientation of the support rollers is stipulated by the conveyor belt itself.

In particular, the first support roller must also take up increased forces in the context of the present invention, because the outer edge of the conveyor belt is additionally pressed against this conveyor roller by the imparted direction of rotation. The inventive arrangement of the support rollers also cannot be implemented with an oval arrangement of the support rollers according to WO 92/02439 A1.

Different possible embodiments of the arrangement of the support rollers arise proceeding from this principle according to the invention. Thus, the distance of the support rollers following one another in the circumferential direction from the centre of gravity can increase continuously either by an identical amount or by a variable amount. If a uniform increase is present, the support rollers are disposed proceeding from a uniform support roller diameter along an arithmetical spiral.

As an alternative, however, it is also possible that, at least viewed in the circumferential direction, a first and second support roller with an identical support roller diameter are disposed along an arc of circle and that at least the last—viewed in the circumferential direction—support roller is disposed radially offset outwards with respect to the arc of circle. If only one or only some of the support rollers are offset outwards, there is a lower outlay for the adaptation compared to known conveyor belt systems. In particular, subsequent retrofitting can also be considered.

In the context of the embodiment according to the invention, the wrapping direction of the conveyor belt in cross-section must be taken precisely into account.

The conveyor belt is usually constituted by a flexible base material, in particular rubber, as well as tension means such as wires or cables embedded in the base material, said wires or cables also being referred to as belt tension means. In the simplest case, the conveyor belt comprises an identical tension means at a constant distance over its entire width. In the case of such a simple conveyor belt, centring in a setpoint position can take place by suitable positioning of the support rollers of the support roller assembly. Moreover, there is however also the possibility of influencing the running properties of the conveyor belt by means of a different embodiment of the tension means along the cross-section and/or by a change in the density of the tension means.

BRIEF DESCRIPTION OF THE SEVERAL VIEWS OF THE DRAWING

The invention will be explained below with the aid of a drawing merely representing an example of embodiment. In the figures.

DESCRIPTION OF THE INVENTION

Within the scope of the invention, the basic structure of a conveyor belt system includes a conveyor belt 1 running in a longitudinal direction as well as support roller assemblies 2 arranged at a distance from one another along conveyor belt 1.

In the example of embodiment represented, support rollers 3a, 3b, 3c, 3d of support roller assembly 2 are disposed in an annular manner in order to shape conveyor belt 1 into a closed tube.

Figure 1:
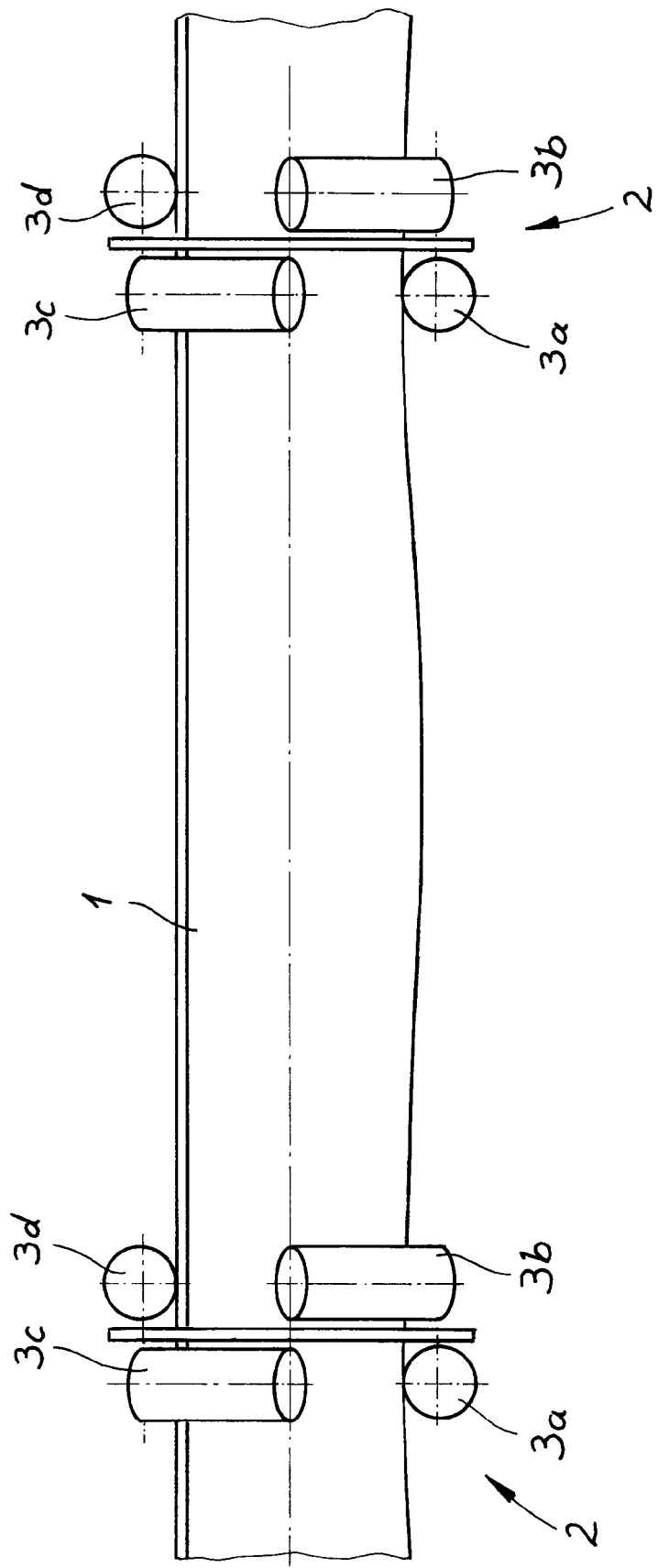
FIG. 1 shows the basic structure of a conveyor belt system in a side view.
Figure 2:
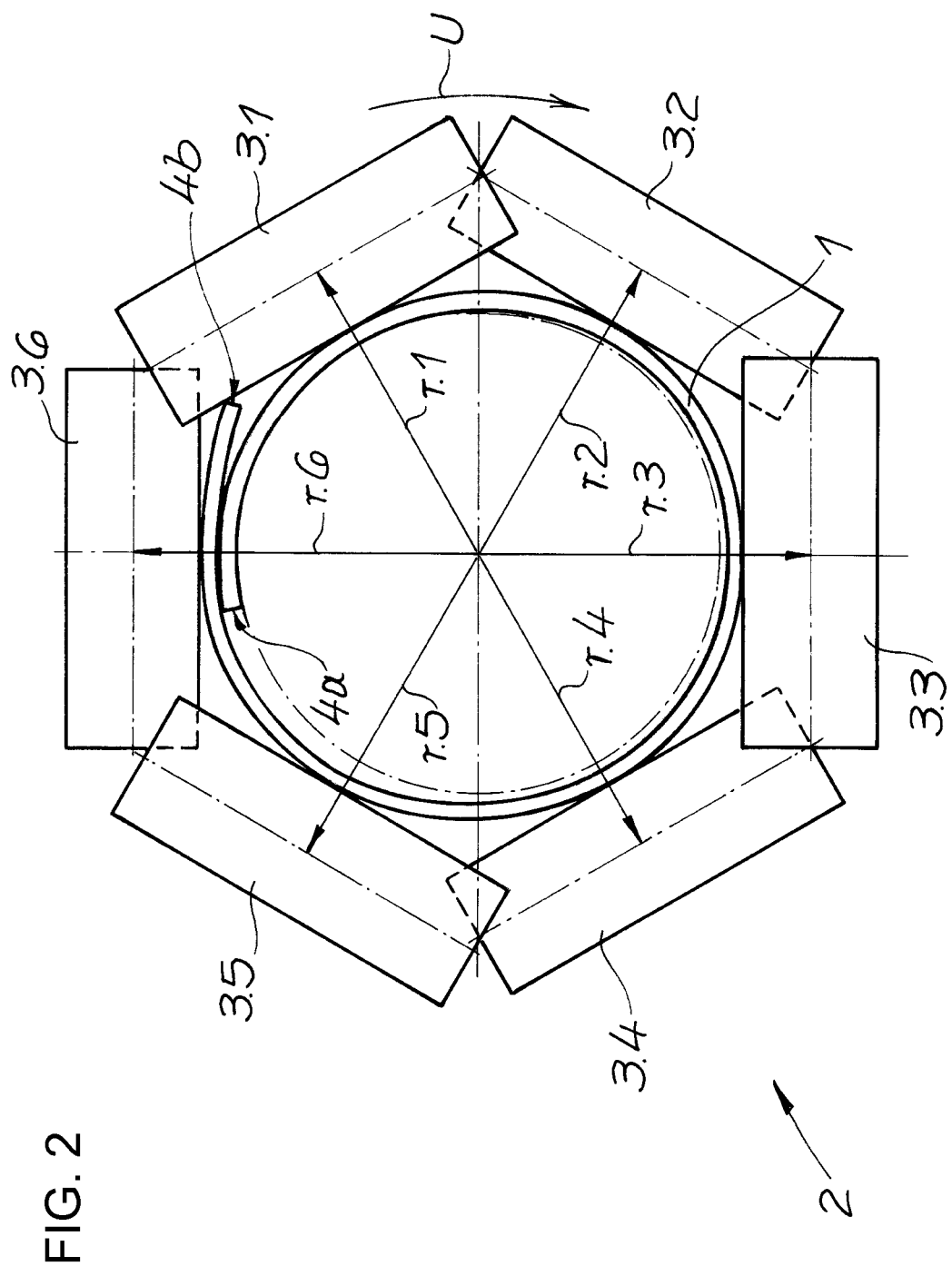
FIGS. 2 and 3 show cross-sections through a conveyor belt system according to the invention in the region of a support roller assembly.
Figure 3:
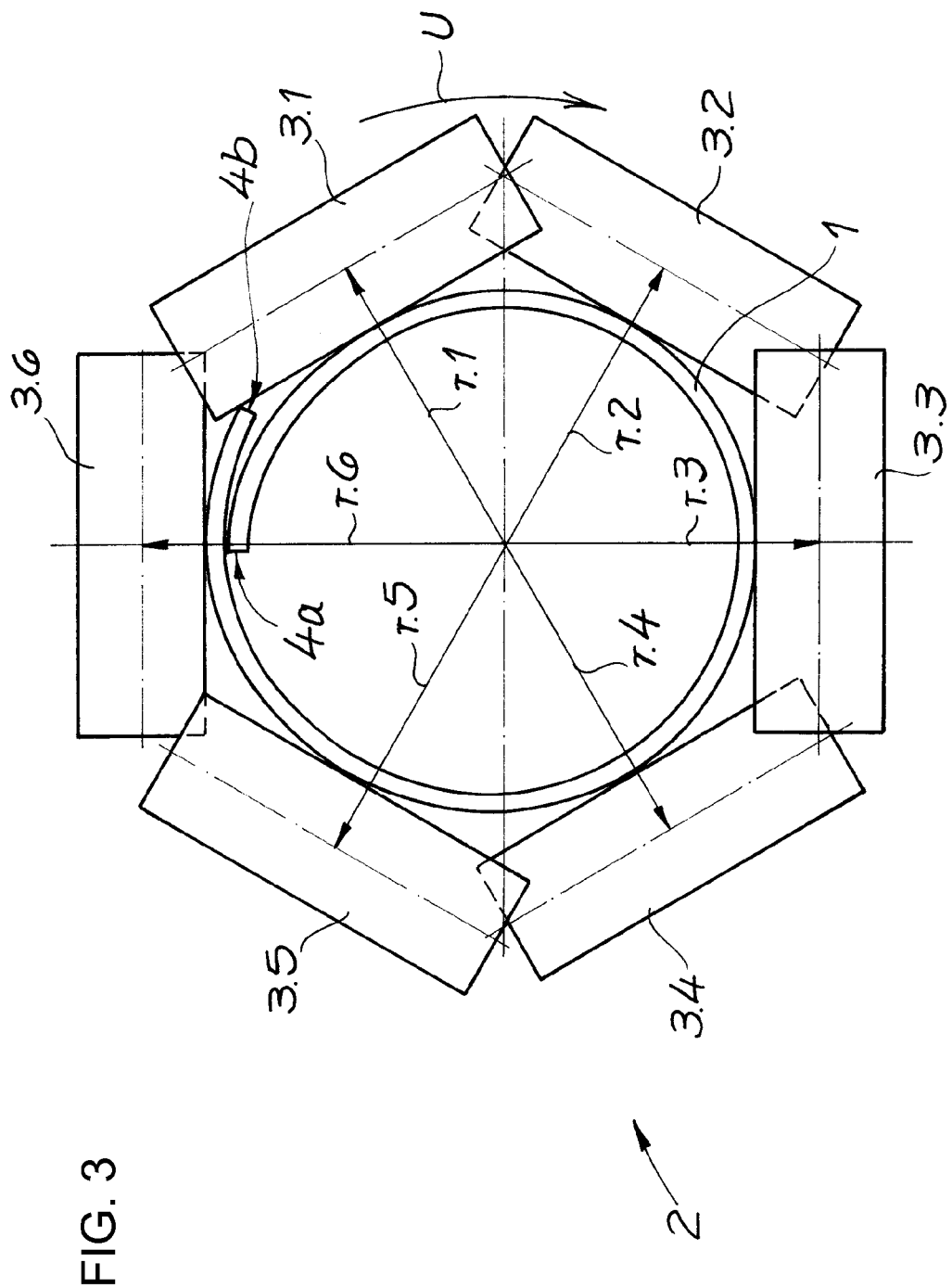

FIGS. 2 and 3 show an alternative embodiment of the conveyor belt system with an arrangement of support rollers 3.1, 3.2, 3.3, 3.4, 3.5, 3.6 which is asymmetrical with respect to a vertical axis. Conveyor belt 1 extends, viewed in cross-section, from edge 4a lying on the inside in the overlap in a circumferential direction U to outer edge 4b, wherein edges 4a, 4b overlap at the last—viewed in circumferential direction U—support roller 3.6. According to the invention, distance r.6 between last—viewed in circumferential direction U—support roller 3.6 and a centre of gravity of the clear profile bounded by support rollers 3.1, 3.2, 3.3, 3.4, 3.5, 3.6 is greater than corresponding distance r.1 of first—in circumferential direction U—adjacent support roller 3.1. Viewed in circumferential direction U, therefore, the cross-section enclosing conveyor belt 1 widens, so that the conveyor belt is forced in circumferential direction U. Edge 4b lying on the outside is pressed against first support roller 3.1, which acts as a stop. Conveyor belt 1 is thus forced into a specific position in the circumferential direction and is held stable there.

According to FIG. 2, support rollers 3.1, 3.2, 3.3, 3.4, 3.5, 3.6 can be disposed along an arithmetical spiral, wherein distance r.1, r.2, r.3, r.4, r.5, r.6 increases uniformly.

FIG. 3 shows an alternative embodiment, wherein the first three support rollers 3.1, 3.2, 3.3 lie on an arc of circle, whereas an increasing distance r.4, r.5, r.6 is then provided for further support rollers 3.4, 3.5, 3.6.

Within the scope of the invention, the decisive factor is the shape of the clear profile, i.e. the distance from the centre of gravity to the surface of the support rollers 3.1, 3.2, 3.3, 3.4, 3.5, 3.6. For reasons of better illustration, the distance from the roller axis is represented with a uniform roller diameter in the figures.

The invention claimed is:

1. A conveyor belt system, comprising:
   a conveyor belt running in a longitudinal direction and having an outer periphery and a circumferential direction;
   support roller assemblies spaced apart along said conveyor belt, said support roller assemblies each including at least four support rollers distributed around said outer periphery of said conveyor belt with an annular positioning configured to shape said conveyor belt into a tube having inner and outer overlapping edges;
   said support rollers including a first support roller and a last support roller lying adjacent one another in said circumferential direction and said support rollers bounding a clear profile having a center of gravity at a respective distance from each of said support rollers;
   said conveyor belt having a cross section extending in said circumferential direction from said inner overlapping edge to said outer overlapping edge and said overlapping edges overlapping at said last support roller;
   said distance from said support rollers, following one another in said circumferential direction, to said center of gravity increasing continuously; and
   said distance from said last support roller to said center of gravity being greater than said distance from said first support roller to said center of gravity.

2. The conveyor belt system according to claim 1, wherein said support rollers are disposed along an arithmetical spiral.

3. The conveyor belt system according to claim 1, wherein said support rollers include a second support roller, said first and second support rollers are disposed along a circular arc and said last support roller is disposed radially offset outwards relative to said circular arc.

5. The conveyor belt system according to claim 1, wherein said at least four support rollers of said support roller assemblies are six support rollers.

5. The conveyor belt system according to claim 1, wherein said conveyor belt is formed of a flexible base material and tensioners embedded in said base material.

* * * * *